US008681874B2

(12) United States Patent
Cheng et al.

(10) Patent No.: US 8,681,874 B2
(45) Date of Patent: Mar. 25, 2014

(54) VIDEO INSERTION INFORMATION INSERTION IN A COMPRESSED BITSTREAM

(75) Inventors: Gary Fujen Cheng, Sunnyvale, CA (US); Wen-Hsiung Chen, Sunnyvale, CA (US); Michael Pereira, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 1320 days.

(21) Appl. No.: 12/047,996

(22) Filed: Mar. 13, 2008

(65) Prior Publication Data

US 2009/0232221 A1    Sep. 17, 2009

(51) Int. Cl.
 *H04N 7/12*    (2006.01)
(52) U.S. Cl.
 USPC ................................................ 375/240.24
(58) Field of Classification Search
 USPC ..................................... 375/240.24, 240.13
 See application file for complete search history.

(56) References Cited

U.S. PATENT DOCUMENTS

| | | | |
|---|---|---|---|
| 6,621,866 | B1 | 9/2003 | Florencio et al. |
| 7,061,981 | B2 * | 6/2006 | Takahashi et al. ....... 375/240.16 |
| 2005/0175099 | A1 * | 8/2005 | Sarkijarvi et al. ....... 375/240.16 |

FOREIGN PATENT DOCUMENTS

| | | |
|---|---|---|
| EP | 0805600 A | 11/1997 |
| EP | 0984633 A | 3/2000 |
| WO | WO 2009/114696 | 9/2009 |

OTHER PUBLICATIONS

Videoegg—Overview obtained at http://videoegg.com/adnetwork.
Brightcove Internet TV Platform obtained at http://www.brightcover.com/products/index.cfm.
Motorola—Connected Home Solutions obtained at http://broadband.motorola.com/business/digitalvideo/CP_landing.asp.
Roma, Nuno, et al., "Fast transcoding architectures for insertion of non-regular shaped objects in the compressed DCT-domain", Signal Processing: Image Communication; available online at www.sciencedirect.com.
PCT International Search Report mailed Aug. 19, 2009 for PCT/US2009/036967; 4 pages.
PCT International Preliminary Report on Patentability and Written Opinion of the International Searching Authority mailed Sep. 14, 2010 for PCT/US2009/036967; 9 pages.

* cited by examiner

*Primary Examiner* — Dang T Ton
*Assistant Examiner* — Kevin Lee
(74) *Attorney, Agent, or Firm* — Patent Capital Group

(57) ABSTRACT

Particular embodiments generally relate to video insertion information insertion in a compressed bitstream. In one embodiment, a compressed bitstream of data is received. Video insertion information to be added to the bitstream is then determined. One or more macroblocks out of a plurality of macroblocks are determined in the compressed bitstream. The macroblocks are determined in the compressed domain and not the spatial domain. Information is selectively inserted for the video insertion information for the determined one or more macroblocks in the compressed bitstream. For example, encoded macroblocks for the video insertion information may replace the determined one or more macroblocks. Also, the one or more macroblocks may be decoded and information for the video insertion information is added to the decoded one or more macroblocks, and then the one or more macroblocks are re-encoded with the information. The re-encoded macroblocks may then replace the determined one or more macroblocks in the compressed bitstream.

15 Claims, 4 Drawing Sheets

VIDEO INSERTION INFORMATION INSERTION IN A COMPRESSED BITSTREAM

TECHNICAL FIELD

Particular embodiments generally relate to video processing.

BACKGROUND

As video providers deliver video to consumers via telecommunication, cable, mobile, etc., revenue generated from advertising becomes increasingly more important to their profitability and viability. Advertisements may be inserted in video that is sent to customers. Delivering advertisements that are targeted to a customer increases the value of advertising. For addressable advertising, an advertisement may be inserted into video being sent to a specific customer that targets the customer's preferences. Advertising could also be targeted to a small set of subscribers based on demographics i.e. locality, age, income, etc.

The video stream is typically decoded to insert video insertion information advertisement in it. The advertisement may then be inserted into the decoded video, and then the video with the embedded advertisement is re-encoded. This adds complexity and cost to advertising insertion systems such as splicers, advertising servers and routing systems that are now required to decode and re-encode the whole frame for a picture with the advertisement. This increases processing requirements and also reduces the picture quality due to the extra decode/encode cycle.

DESCRIPTION OF EXAMPLE EMBODIMENTS

Overview

Particular embodiments generally relate to video insertion information insertion in a compressed bitstream. In one embodiment, a compressed bitstream of data is received. Video insertion information to be added to the bitstream is then determined. One or more macroblocks out of a plurality of macroblocks are determined in the compressed bitstream. The macroblocks are determined in the compressed domain and not the spatial domain. Information is selectively inserted for the video insertion information for the determined one or more macroblocks in the compressed bitstream. For example, encoded macroblocks for the video insertion information may replace the determined one or more macroblocks. Also, the one or more macroblocks may be decoded and information for the video insertion information is added to the decoded one or more macroblocks, and then the one or more macroblocks are re-encoded with the information. The re-encoded macroblocks may then replace the determined one or more macroblocks in the compressed bitstream.

Example Embodiments

Figure 1:
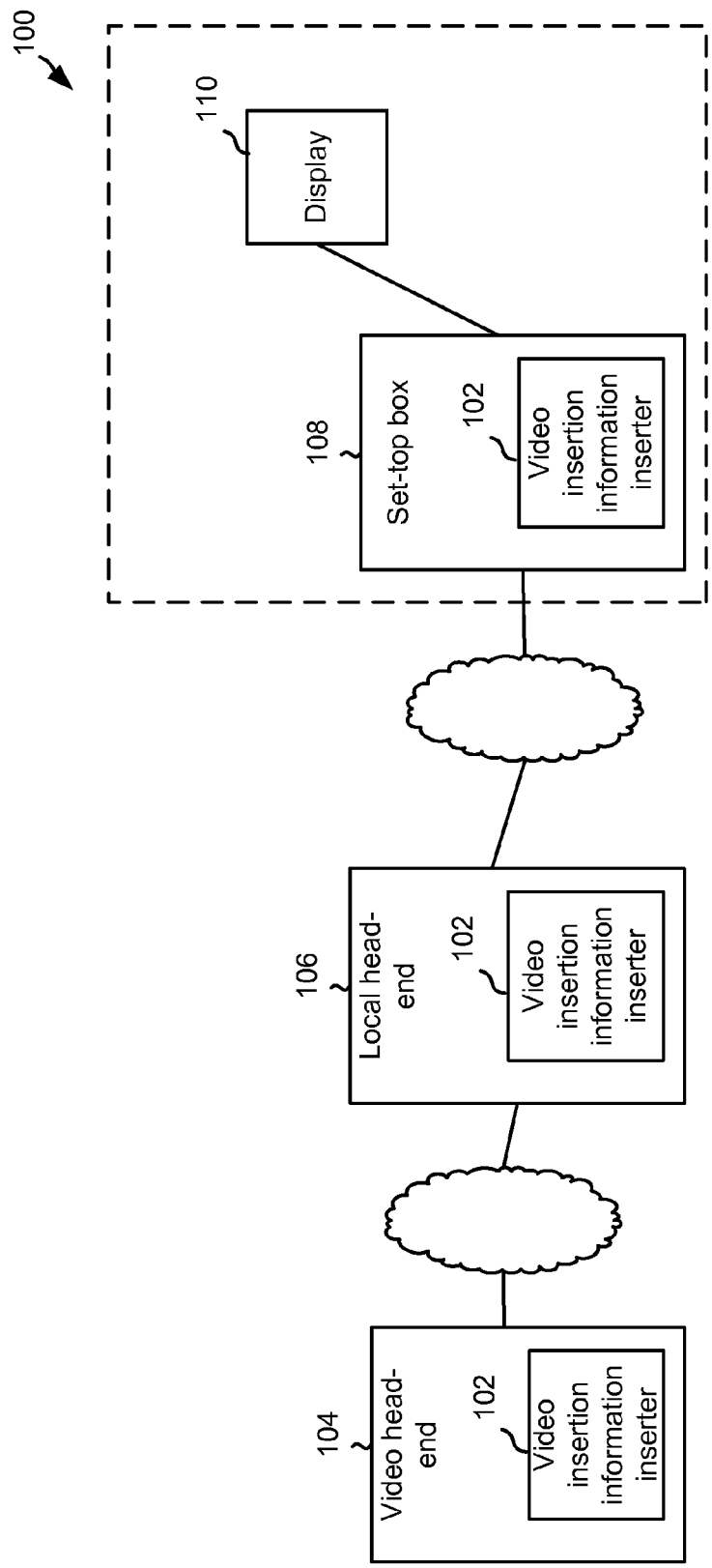
FIG. 1 depicts an example of an end-to-end video delivery system and shows the various places video insertion information insertion can be accomplished according to one embodiment.

FIG. 1 depicts an example of a system according to one embodiment. System 100 is used to deliver video to users. A simplified system 100 is shown, but it will be understood that a person skilled in the art will appreciate other elements that may be included in system 100.

A video head-end 104, a local head-end 106, and a set-top box 108 are provided in a video network. Also, video insertion information inserter 102 may be included in any location. For example, video insertion information may be inserted at the local head-end, set-top box, or video head-end. Also, routers that are delivering the video content in the network may also insert the video insertion information.

Video streams are typically received at Video Headend 104 via a distribution network such as satellite. The video Service Provider's Video head-end 104 may then re-purpose the video streams prior to be delivering them to the user.

Local head-end 106 may be found in a central office for a telecommunications provider or any other regional office. Local head-ends allow the Service Provider to re-groom and do local advertisement insertion to target a finer granularity of subscriber demographics. For example, local head-end 106 may be an office that is closer to a user. Video head-end 104 and local head-end 106 may include video content delivery devices, such as routers, switches along with advertising insertion equipment, that deliver video to set-top box 108, which may be found in a home, office, etc. Set-top box 108 may be any computing device that may be able to decode the video and display it on a display device 110.

Video insertion information inserter 102 is configured to insert video insertion information into the compressed video bitstream. For example, macroblocks may be inserted into the compressed bitstream to replace other macroblocks. The replacement is performed when the bitstream is compressed and not in the spatial domain, hence video insertion information inserter in the set-top box 108 would sit before the decoder functionality. The spatial domain is where the information is not encoded.

Video insertion information may be related to advertisements that are embedded in the video stream from the Video Head-End and the video insertion information that is added will allow for customization and/or localization. The video insertion information may be added in a video stream after it has been sent from video head-end 104. Video insertion information may be any information that is inserted into the compressed bitstream. The video insertion information may replace video in a picture completely (also called a replacement advertisement message) or may be overlaid over the video (transparent advertisement message also known as an overlay). For example, if the picture includes an image of a car, a car name may be inserted into the video bitstream. The car name may be overlaid over the image of the car such that the car can still be seen under the car name (i.e., the car name is combined with the image of the car). Also, the car name may replace all information in the bitstream such that a macroblock including the car name replaces whatever information was included in a previous macroblock for the car image.

Video insertion information may include static or dynamic information. For example, static information may include a logo or other information that does not change. Dynamic video insertion information may include tickers, crawls, video, or other information that changes over time.

The video insertion information is inserted by determining the number and location of macroblocks affected by the insertion of the video insertion information. For example, macroblocks are determined that may be modified by the video insertion information and are replaced in the compressed domain. The macroblocks are replaced between reference frames. Since only certain macroblocks are replaced, an entire frame does not have to be processed (i.e., decoded), and only adjacent macroblocks may be affected. This decreases the processing complexity needed to insert the video insertion information and hence the cost associated.

Figure 2:
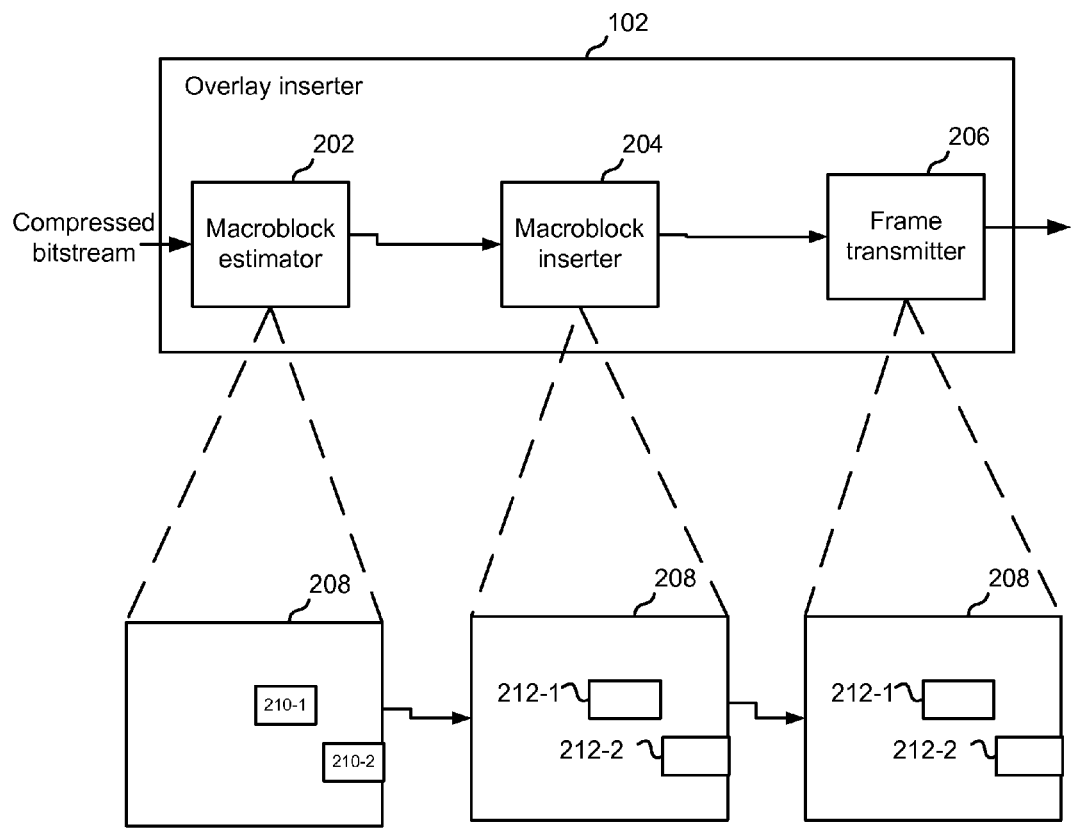
FIG. 2 depicts a more detailed example of video insertion information inserter according to one embodiment.

FIG. 2 depicts a more detailed example of video insertion information inserter 102 according to one embodiment. As shown, a macroblock estimator 202, a macroblock inserter 204, and a frame transmitter 206 are provided. Macroblock estimator 202 receives a compressed bitstream of data. For example, the bitstream of data include a number of frames. A frame of data may include multiple macroblocks. A stream of data includes multiple compressed frames or pictures. Multiple pictures form a GOP or Group of Pictures. Each GOP begins with a reference frame. Each picture includes slices and each slice contains a number of macroblocks. A macroblock may represent a block of data, which may be variable in size, such as 16×16, 8×16, etc. pixels.

Macroblock estimator 202 determines whether one or more macroblocks that should be replaced to fit the video insertion information into the video and also which ones. Macroblock estimator 202 may use information associated with the video bitstream to determine which macroblocks to replace. For example, the bitrate, macroblock size, metadata, or other information may also be used to determine which macroblocks may be replaced. In one example, a position to insert the video insertion information in a picture may be specified and the macroblocks including information for the position are determined. Also, macroblock estimator 202 may dynamically determine an optimal location in the video for inserting the video insertion information. Optimal macroblocks may be determined based on a number of criteria related to the bitstream, such as a minimized motion vector, low coding density, background characteristics, etc. For example, an area that includes very little motion may be a good candidate for inserting video insertion information. Macroblock estimator 202 is 'aware' of the video insertion information details such as size among others, that is to be inserted into the compressed video stream.

Another embodiment is to have the compressed video insertion information delivered to local head-end 106 prior to being required along with a schedule for insertion into the bitstream. Metadata describing the video insertion information attributes such as the time of play, affected macroblocks, bit rate, etc., can be associated with that pre-compressed video insertion information and passed to macroblock estimator 202. The insertion of video insertion information can be triggered either by time or by an in-band trigger mechanism. The delivery of the compressed video insertion information could be included as a separate PID (program ID) in the same stream.

Another embodiment is to have the compressed video insertion information delivered from video head-end 104 as a separate stream along with the associated metadata that describes the video insertion information attributes and trigger time.

Macroblock inserter 204 is configured to insert the video insertion information into the compressed bitstream. As will be discussed in further detail below, the information for the video insertion information may completely replace the macroblocks or be overlaid (combined with information in the determined macroblocks).

Once the macroblocks have been inserted into the compressed bitstream, a frame transmitter 206 may transmit the frame. The frame transmitted includes the video insertion information that has been inserted in the frame.

FIG. 2 also depicts an example of a frame of data 208 as it progresses through the processing according to one embodiment. A macroblock estimator 202 may determine macroblocks 210-1 and 210-2 should be replaced to include the video insertion information. These macroblocks are determined.

Macroblock inserter 204 then replaces macroblocks 210-1 and 210-2 with replacement macroblocks 212-1 and 212-2. These macroblocks are for the video insertion information. This is performed in the compressed bitstream.

Frame transmitter 208 then transmits the frame with replacement macroblocks 212-1 and 212-2. As such, a decoding of frames and re-encoding is not necessary to insert the video insertion information.

Figure 3:
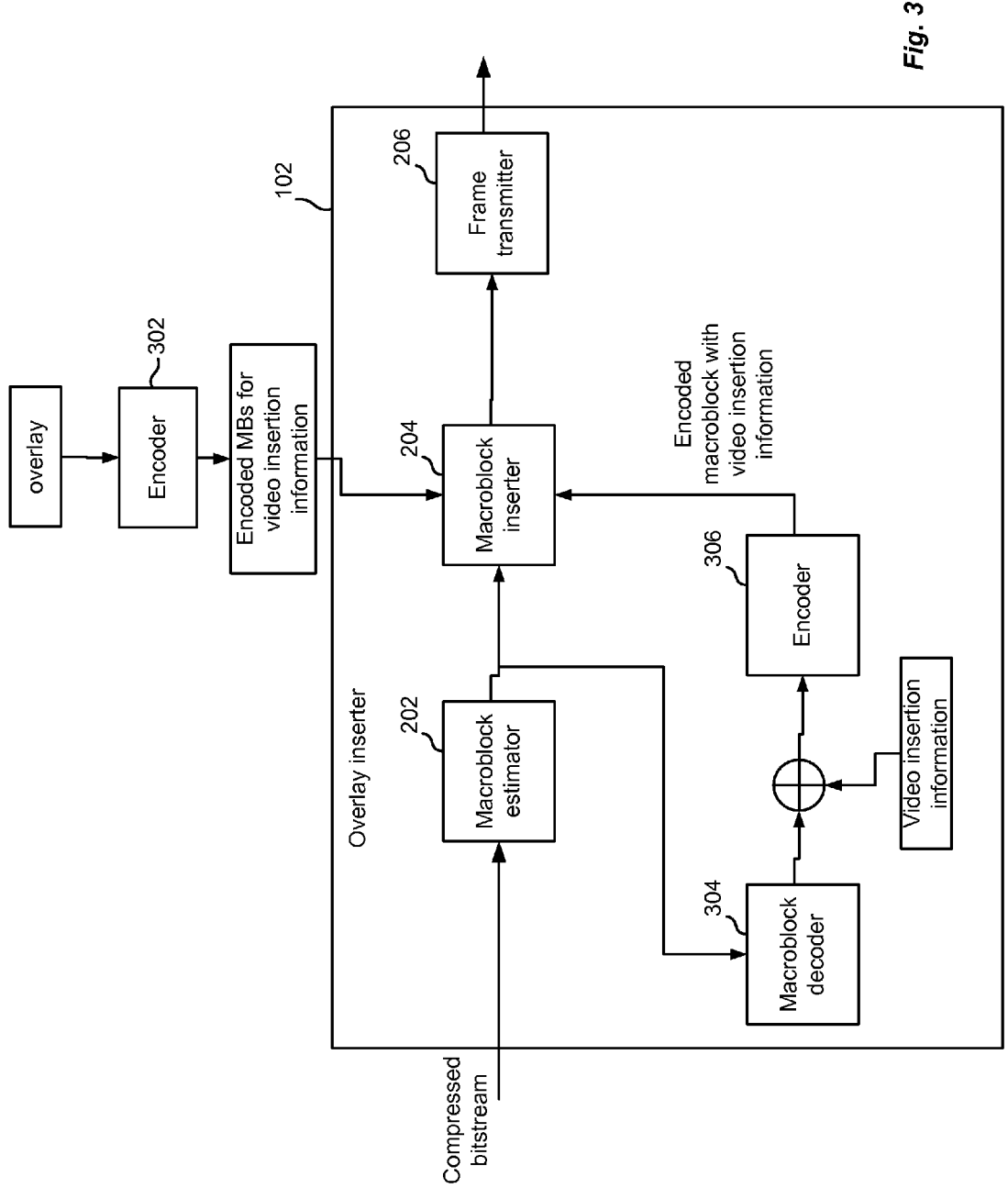
FIG. 3 depicts a more detailed example of the video insertion information inserter according to one embodiment.

The processing for when the video insertion information replaces the video or is overlaid in the video will now be described. FIG. 3 depicts a more detailed example of video insertion information inserter 102 according to one embodiment. In one example, macroblocks 210-1 and 210-2 may be completely replaced with macroblocks including information for the video insertion information. A compressed bitstream may be received at macroblock inserter 204. Macroblock estimator 202 may determine which macroblocks should be replaced.

Before inserting the video insertion information in the compressed bitstream, the information for the video insertion information is compressed. Video insertion information may be received at an encoder 302. Encoder 302 may then encode the video insertion information into one or more macroblocks. In one example, the encoded macroblocks for the video insertion information may match the number of the macroblocks being replaced. For example, the number of the macroblocks to be replaced is known and may substantially match the number of the macroblocks for the video insertion information. Thus, the adjustments to the bitstream may be minimized because the same number of macroblock is being inserted as the macroblock being replaced. Macroblock inserter 204 then replaces the one or more determined macroblocks from the compressed bitstream with the encoded video insertion information macroblocks. Other embodiments would allow the macroblocks to be replaced to be specified either in-band or out-of-band as attached metadata.

To replace the macroblocks, macroblock estimator 202 may determine a point in the bitstream that corresponds to the determined macroblock. In one embodiment, a macroblock is determined by determining the packetized elementary stream (PES) packet boundary. The PES packet header is found and used to determine the packet boundary. A picture header is then determined to find the picture boundary. The picture header contains the type of picture that is present, i.e., I, P, B picture including a temporal reference indicating the position of the picture in display order within the Group of Pictures (GOP). A slice header is then found and used to determine the slice boundary. A Slice is a string of macroblocks of arbitrary length running from left to right and top to bottom across the picture. The slice header contains the vertical position of the slice within the picture. The macroblock boundary is then determined using the macroblock location header. The macroblock header contains the horizontal location of each macroblock within the slice, with the first macroblock header location being absolute and the others in the slice being differential to the most recently transmitted Macroblock. The encoded macroblock may be inserted into the bitstream at the boundary point to replace the macroblock. Macroblock estimator 202 may communicate macroblock or macroblocks to be replaced location(s) in the bitstream to video insertion information inserter 204.

The above replacement description may be for one frame; however, the video insertion information may be displayed for multiple frames or pictures. For example, the video insertion information may be displayed for five seconds in the video. Thus, the video insertion information needs to be replaced in multiple frames. In one embodiment, macroblock inserter 204 may identify a reference I-frame and buffer it. The original macroblock is replaced with the encoded video insertion information macroblock starting with the Reference I-frame selected. Macroblocks are continually replaced in subsequent frames (such as B-frames, P-frames, or I-frames) with the encoded video insertion information for the selected time. For example, if the video insertion information should be visible for five seconds, the same macroblocks in multiple frames may be replaced for frames including information displayed for the five second period. The end of the video insertion information may then be closed with a Reference I-frame.

Macroblock inserter 204 then transmits the frame to frame transmitter 206. Frame transmitter 206 may perform a bit rate adjustment or buffer fullness adjustment (vertical buffer verifier). The bit rate adjustment may be performed because the video characteristics associated with the original bit-stream have now been modified by the video insertion information. Also, buffer fullness adjustment may be performed. Bit rate (from frame transmitter 206) may be adjusted to correspond to the incoming bit rate or the streaming bit rate associated with the video stream. Buffer fullness implies compliance with MPEG2 vbv (video buffering verifier) which is adjusted per spec to eliminate decoder video buffer overflow and underflow conditions.

In another embodiment, the information for the video insertion information may be combined with information in the determined macroblocks. In one embodiment, the information may be combined in the spatial domain and not the compressed domain. A macroblock decoder 304 may decode the determined macroblocks that have been identified for replacement. The decoded macroblocks may be combined with the video insertion information in the spatial domain. The combination is performed only for the macroblocks affected by the video insertion information in one embodiment, and not for macroblocks that are not affected. The not affected macroblocks may not be decoded, which reduces processing overhead for decoding/encoding the whole frame.

An encoder 306 encodes the combined macroblocks. Then, macroblock inserter 204 may replace the determined macroblocks with the macroblocks that include the combined information. Although the macroblocks are decoded and combined with information for the video insertion information, the replacement is performed in the compressed bitstream. For example, the new macroblocks replace the previous macroblocks in the compressed bitstream.

Figure 4:
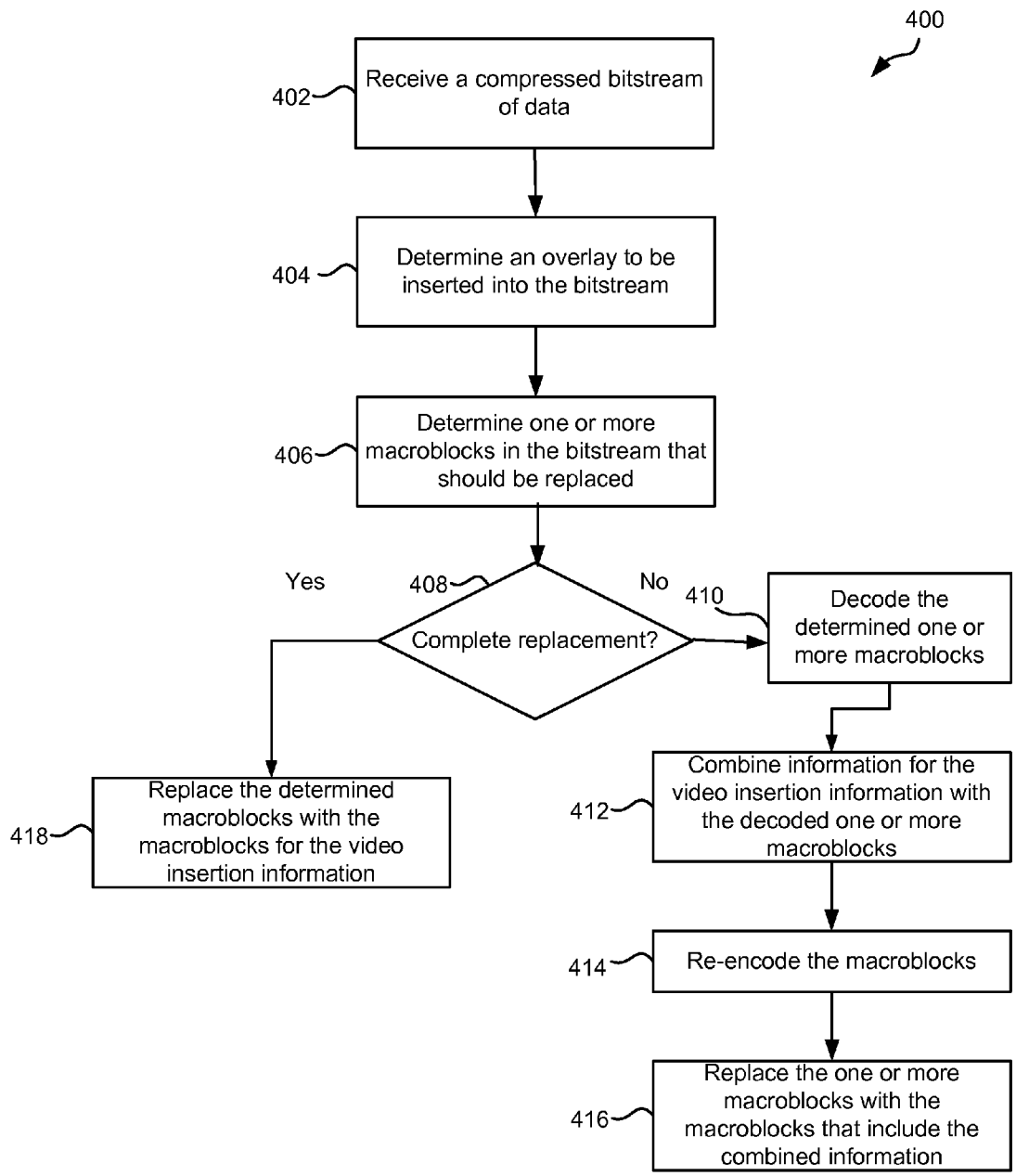
FIG. 4 depicts a simplified flowchart of a method for performing insertion of video insertion information according to one embodiment.

FIG. 4 depicts a simplified flowchart 400 of a method for performing insertion of video insertion information according to one embodiment. Step 402 receives a compressed bitstream of data. Step 404 determines video insertion information to be inserted into the bitstream. Step 406 determines one or more macroblocks in the bitstream that should be replaced.

The replacement may then be a complete replacement or video insertion information. Step 408 determines if it is a complete replacement. If not, step 410 decodes the determined one or more macroblocks. Step 412 combines information for the video insertion information with the decoded one or more macroblocks. Step 414 then re-encodes the macroblocks. Step 416 replaces the one or more macroblocks with the macroblocks that include the combined information.

If the macroblocks are to be replaced, step 418 replaces the determined macroblocks with the macroblocks for the video insertion information.

Particular embodiments provide many advantages. Minimized processing is required because only macroblocks affected by the video insertion information may be processed. Also, reduced cost because the generator of the video insertion information is not required at local head-end 106. Rather, the video insertion information may be generated prior to the insertion and distributed to local head-end sites prior to or simultaneous with the content being delivered.

Although the description has been described with respect to particular embodiments thereof, these particular embodiments are merely illustrative, and not restrictive. Although advertisements are described, it will be understood that any information may be inserted in a video stream.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method comprising:
  receiving a compressed bitstream of data;
  determining video insertion information to be added to the bitstream;
  identifying one or more macroblocks in the compressed bitstream to be removed from the bitstream and replaced by the video insertion information, wherein the one or more macroblocks are selected for removal and replacement based, at least, on a bitrate and a level of motion associated with the one or more macroblocks; and
  removing the identified one or more macroblocks and replacing the removed one or more macroblocks with the video insertion information;
  wherein the one or more macroblocks are selected for replacement based, at least, on background characteristics associated with the bitstream; and
  wherein insertion of the video insertion information is triggered by an in-band trigger mechanism.

2. The method of claim 1, further comprising:
  analyzing the bitstream; and
  determining an optimal location to insert the video insertion information based on one or more criteria associated with the compressed bitstream.

3. The method of claim 1, further comprising:
  decoding the identified one or more macroblocks;
  adding the video insertion information into the decoded determined one or more macroblocks;
  encoding the one or more macroblocks with the added video insertion information; and
  inserting the encoded one or more macroblocks for the identified one or more macroblocks in the compressed bitstream.

4. The method of claim 1, wherein identifying the one or more macroblocks comprises determining a number of macroblocks that need to be replaced to fit the video insertion information in an overlap in the compressed bitstream.

5. The method of claim 1, wherein identifying the one or more macroblocks comprises:
  determining a location to insert the video insertion information into the compressed bitstream based on one or more criteria; and
  determining one or more macroblocks in the location.

6. The method of claim 1, further comprising:
  determining a time period for displaying the video insertion information; and
  determining the one or more macroblocks based on the time period.

7. The method of claim 1, wherein the replacement comprises:
  starting the replacement at a first I frame;
  continuing the replacement in subsequent frames; and
  ending the replacement at a second I frame.

8. An apparatus comprising:
  one or more processors; and
  logic encoded in one or more tangible media for execution by the one or more processors and when executed operable to:
    receiving a compressed bitstream of data;
    determining video insertion information to be added to the bitstream;
    identifying one or more macroblocks in the compressed bitstream to be removed from the bitstream and replaced by the video insertion information, wherein the one or more macroblocks are selected for removal and replacement based, at least, on a bitrate and a level of motion associated with the one or more macroblocks; and
    removing the identified one or more macroblocks and replacing the removed one or more macroblocks with the video insertion information;
  wherein the one or more macroblocks are selected for replacement based, at least, on background characteristics associated with the bitstream; and
  wherein insertion of the video insertion information is triggered by an in-band trigger mechanism.

9. The apparatus of claim 8, wherein the logic when executed is further operable to:
  analyze the bitstream; and
  determine an optimal location to insert the video insertion information based on one or more criteria associated with the compressed bitstream.

10. The apparatus of claim 8, wherein the logic is further operable to:
  decode the identified one or more macroblocks;
  add the video insertion information into the decoded determined one or more macroblocks;
  encode the one or more macroblocks with the added video insertion information; and
  insert the encoded one or more macroblocks for the identified one or more macroblocks in the compressed bitstream.

11. The apparatus of claim 8, wherein logic operable to identify the one or more macroblocks comprises logic is further operable to determine a number of macroblocks that need to be replaced to fit the video insertion information in an overlap in the compressed bitstream.

12. The apparatus of claim 8, wherein logic operable to identify the one or more macroblocks comprises logic is further operable to:
  determine a location to insert the video insertion information into the compressed bitstream based on one or more criteria; and
  determine one or more macroblocks in the location.

13. The apparatus of claim 8, wherein the logic when executed is further operable to:
  determine a time period for displaying the video insertion information; and
  determining the one or more macroblocks based on the time period.

14. The apparatus of claim 8, wherein the logic operable to replace comprises logic further operable to:
  start the replacement at a first I frame;
  continue the replacement in subsequent frames; and
  end the replacement at a second I frame.

15. An apparatus comprising:
  means for receiving a compressed bitstream of data;
  means for determining video insertion information to be added to the bitstream;
  means for identifying one or more macroblocks in the compressed bitstream to be removed from the bitstream and replaced by the video insertion information, wherein the one or more macroblocks are selected for removal and replacement based, at least, on a bitrate and a level of motion associated with the one or more macroblocks; and means for removing the identified one or more macroblocks and replacing the removed one or more macroblocks with the video insertion information;

wherein the one or more macroblocks are selected for replacement based, at least, on background characteristics associated with the bitstream; and wherein insertion of the video insertion information is triggered by an in-band trigger mechanism.

* * * * *